INVENTORS
MASAMICHI SHIRAISHI
HIROHIKO YAMAMOTO
BY
Hopgood & Calimafde
ATTORNEYS

INVENTORS
MASAMICHI SHIRAISHI
HIROHIKO YAMAMOTO

BY Hopgood & Calimafde
ATTORNEYS

INVENTORS
MASAMICHI SHIRAISHI
HIROHIKO YAMAMOTO
BY
Hopgood & Calimafde
ATTORNEYS United States Patent Office
3,467,952
Patented Sept. 16, 1969

3,467,952
FIELD EFFECT TRANSISTOR INFORMATION STORAGE CIRCUIT

Masamichi Shiraishi and Hirohiko Yamamoto, Tokyo, Japan, assignors to Nippon Electric Company, Ltd.

Filed Feb. 9, 1967, Ser. No. 614,959
Claims priority, application Japan, Feb. 9, 1966, 41/7,597
Int. Cl. G11b 9/00
U.S. Cl. 340—173 3 Claims

ABSTRACT OF THE DISCLOSURE

A novel non-destructive information storage circuit is constituted by a flip-flop circuit having two field effect transistors, and a load impedance connected to each of the transistors; each impedance consisting of a high and low resistance resistor. A diode is connected to the junction between the two resistors of each load impedance so that the power dissipation of the storage circuit is minimized and the read-out information voltage maximized.

This invention relates to an information storage circuit of the type which employs as its principal constituent element a flip-flop circuit including MOS-type field-effect transistors (hereinafter referred to as MOSTs).

While the various storage devices possess particular advantages, no information storage device is presently known which combines the attributes of: non-destructive read-out of stored information short cycle time; large output energy for electronic computer use; microminiaturized dimensions; and suitability for mass-production techniques.

It is the object of the present invention to provide an information storage device satisfying most or all of the foregoing conditions simultaneously.

Briefly, the invention is predicated upon integrated elementary storage circuits comprising flip-flop circuits employing MOSTs which are formed in a common semiconductor substrate together with diodes, and resistive elements composed of a thermal reaction layer of aluminum and silicon-oxide film (referred to hereinafter as an Al-$SiO_2$ resistor element). It is possible, according to the present invention, to provide an information storage device of non-destructive read-out type which has the cycle time as short as 200 nanoseconds, which produces output voltages larger than 2 volts; which manifests perfect stability against noise; which is suitable for economical mass-production, and which can be miniaturized to the extent that approximately 300 elementary storage circuits can be incorporated in a semiconductive structure 1 $cm.^2$.

The above-mentioned and other features and objects of this invention and the manner of attaining them will become more apparent and the invention itself will best be understood by reference to the following description of embodiments of the invention taken in conjunction with the accompanying drawings wherein.

Figure 3:
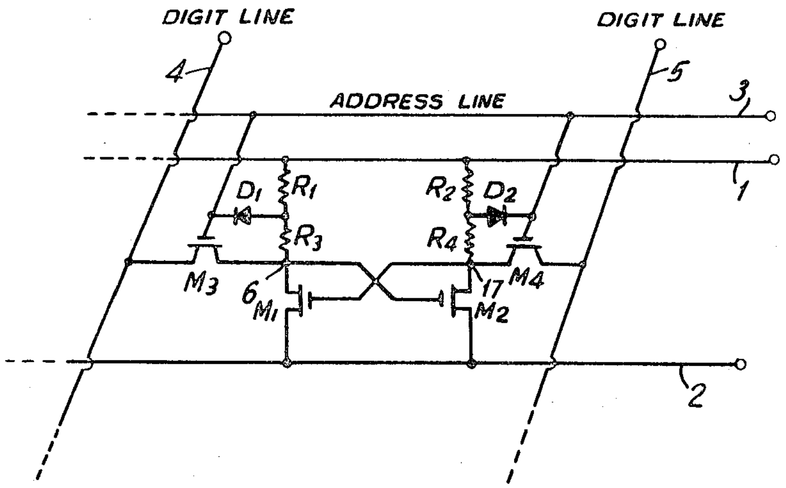
Figure 4:
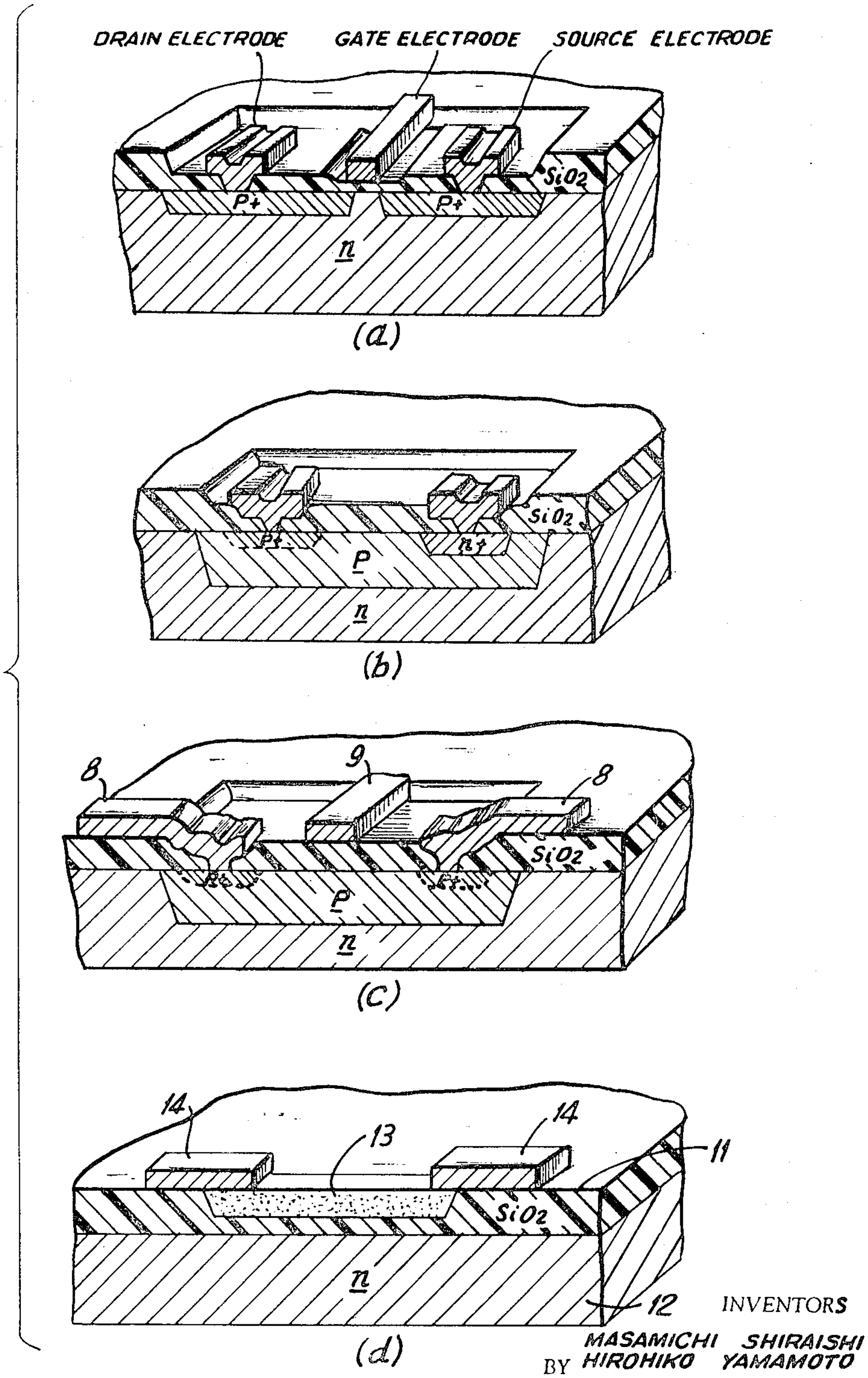
Figure 5:
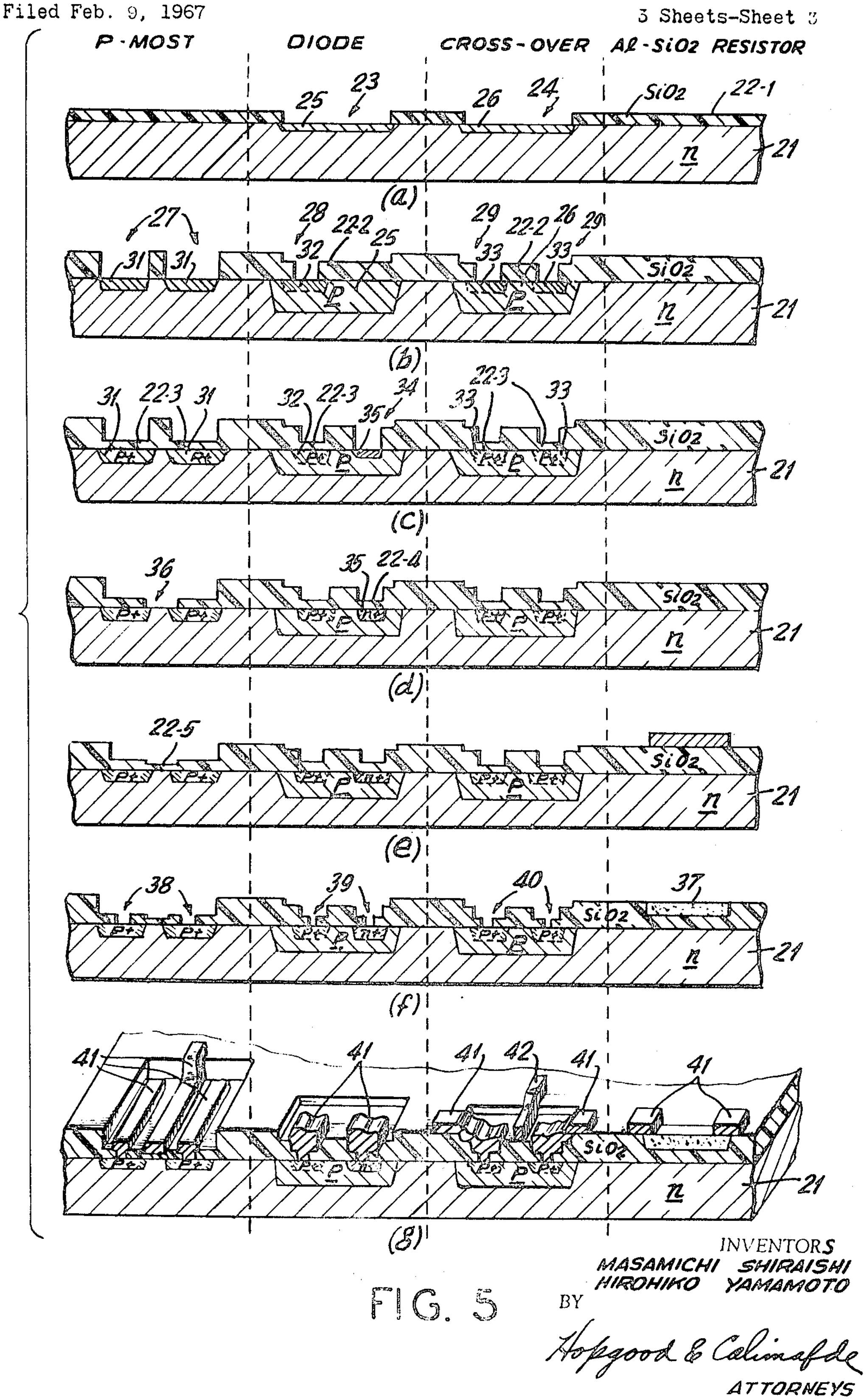

FIG. 3 schematically illustrates an embodiment of the information storage circuit of the present invention;

FIGS. 4(*a*), (*b*), (*c*), and (*d*) are sectional perspectives showing the structure of the various elements used in an integrated information storage device according to the invention; and FIGS. 5(*a*), (*b*), (*c*) (*d*), (*e*), (*f*), and (*g*) illustrate sectional views of the integrated semiconductor device according to the invention during stages in its manufacture.

Figure 1:
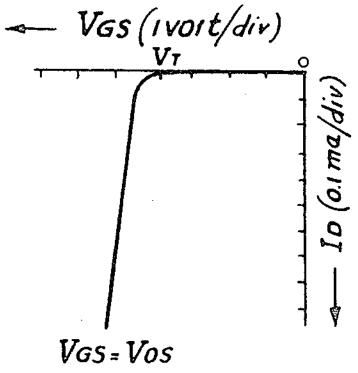
FIG. 1 illustrates the voltage versus current characteristic of a typical MOST, having a p-type channel, for use in the present invention.

In FIG. 1, the voltage $V_{GS}$ (between gate and source electrodes) versus the drain current $I_D$ characteristics of a MOST is shown, for the case where the voltage $V_{DS}$ between the drain and the source electrodes is made equal to the voltage $V_{GS}$. In the preferred embodiment of the present invention, a MOST of the enhancement type will be used, in which the drain current $I_D$ is caused to flow when the voltage $V_{GS}$ becomes equal to $V_T$ (threshold voltage), while the current $I_D$ is turned to cut off when $V_{GS}$ is equal to zero, as shown in FIG. 1.

Figure 2:
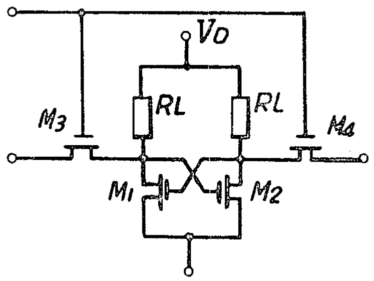
(PRIOR ART) FIG. 2
FIG. 2 is a circuit diagram of a conventional information storage circuit.

Referring to FIG. 2, a conventional flip-flop circuit composed of MOSTs $M_1$, $M_2$ and load resistors $R_L$, is used for storing informations "1" and "0." MOSTs $M_3$ and $M_4$ are employed for writing in and reading out this information. The switching speed of this circuit generally depends upon the product of the load resistance $R_L$ and the capacitance C between the drain electrode and the power source. Although the load resistance $R_L$ and the capacitance C must be minimized in order to shorten the switching time, the capacitance C cannot be decreased beyond a certain limit because of difficulties encountered in the manufacturing process. Thus, the resistance $R_L$ must be minimized. If the value of $R_L$ is decreased, however, the flip-flop circuit will become unsuitable for information storing use, because the dissipation of power in each elementary storage circuit will increase in response to the increase in the drain current from the power supply.

The switching speed of the conventional device is so slow that its cycle time as an information storage device is about 2 microseconds for a data handling device for 4 bits×16 words. This is because the effective load resistances $R_L$ are large.

The information storage circuit of the present invention which is shown in FIG. 3 is characterized in that: the load $R_L$ of the conventional device is divided into the resistors $R_1$ and $R_3$, and resistors $R_2$ and $R_4$, respectively, the resistors $R_1$ and $R_2$ being of high resistivity for minimizing the dissipation power, and the resistors $R_3$ and $R_4$ being of low resistivity for shortening the switching time; and diodes $D_1$ and $D_2$, which serve as forward-biased diodes during the switching period, and contribute to a shortening of the switching time in cooperation with resistors $R_3$ and $R_4$, are respectively connected between the gate electrode of the MOST $M_3$ and the junction of resistors $R_1$ and $R_3$, and between the gate electrode of the MOST $M_4$ and the junction of resistors $R_2$ and $R_4$.

For purposes of clarification, the operation of the circuit shown in FIG. 3 will be described using numerical value examples. First, it is assumed that the resistances $R_1$ and $R_2$ are each 1 megohm, and the resistances $R_3$ and $R_4$ are 10 kilohms. When the information "1" or "0" is initially stored, the potential of the terminal 1 of the power supply line is −12 volts, terminal 2 of the ground line and terminal 3 of the address line are 0 volts, and terminals 4 and 5 of the digit lines are −8 volts.

When the information "1" is stored, one stable state is maintained in such a manner that the MOST $M_1$ is conductive, while MOSTs $M_2$, $M_3$ and $M_4$ are non-conductive. Thus current does not flow through resistors $R_2$ and $D_4$, and diodes $D_1$ and $D_2$, but does flow through resistors $R_1$ and $R_3$. The potentials of junctions 6 and 7 are thereby approximately maintained at 0 and −12 volts, respectively.

When the information "0" is stored, on the other hand, another stable state is maintained in such a manner that MOSTs $M_1$, $M_3$ and $M_4$ are non-conductive, while the MOST $M_2$ is conductive and current does flow through resistors $R_2$ and $R_4$, but not through diodes $D_1$ and $D_2$ and resistors $R_1$ and $R_3$. In this case, the potentials of the points 6 and 7 are approximately maintained at −12 volts and 0 volts, respectively.

Independently of whether the "1" or "0" stable state is reached, the current is extremely small (12 microamperes, for example), because the resistances $R_1$ and $R_2$ are 1 megohm.

When the information "1" is to be written in the storage circuit, the potentials of the terminals 3 and 4 are changed from 0 volts and −8 volts to −12 volts and 0 volts, respectively, without changing the potentials of the terminals 1, 2 and 5 which are maintained at −12 volts, 0 volts and −8 volts, respectively. The potentials of the points 6 and 7 thereby tend to be 0 volts and −12 volts, respectively, with the result that the information "1" is stored. It will be noted in this case that the diodes $D_1$ and $D_2$ serve as a forward-biased diode, and that the switching time is controlled by the low resistances of the the resistors $R_3$ and $R_4$. High speed switching of the order of less than 100 nanoseconds is thereby achieved.

When information "0" is to be written in the circuit, the potentials of the terminals 3 and 5 are changed from 0 volts and −8 volts to −12 volts and 0 volts, respectively, without changing the potentials of the terminals 1, 2 and 4 which are maintained at −12 volts, 0 volts and −8 volts, respectively. Consequently, the potentials of the points 6 and 7 become −12 volts and 0 volts, respectively, with the result that the information "0" is stored.

To read-out the stored information, the potential of the terminal 3 is changed from 0 volts to −12 volts, without changing the potentials of terminals 1, 2, 4 and 5 which are maintained at −12 volts, 0 volts, −8 volts and −8 volts, respectively. When the information "1" has been stored, and immediately before the read-out operation, the potentials of the points 6 and 7 are at 0 volts and −12 volts, respectively, whereby MOSTs $M_3$ and $M_4$ become conductive and non-conductive, respectively, and the current flowing through MOSTs $M_1$ and $M_3$ is derived from the terminal 4 as the read-out output. The read-out operation causes the potential of the point 6 to change from 0 volts to about −4 volts, however, MOST $M_2$ is still maintained in a non-conductive state because the threshold value $V_T$ of MOST $M_2$ is approximately −5 volts. Thus, the information state "1" is not impaired by the read-out operation. In other words, a non-destructive read-out has become feasible. If the information which has been stored immediately before read-out operation is "0," the output appears at the terminal 5 but not at the terminal 4. Thus, the stored information is identified as a "0."

Since the output voltage obtainable at the reading device is greater than 2 volts, a complicated amplifier is not needed. Such an amplifier is indispensable to the conventional storage device employing ferrite memory elements.

Each of diodes $D_1$ and $D_2$ operates as a forward-biased diode during the reading-out period. The current flowing through each of the diodes $D_1$ and $D_2$ is about 1.2 milliamperes in the write-in and the read-out periods in which the diodes $D_1$ and $D_2$ are in the forward-biased state. At times other than the write-in and read-out periods, the current is kept at extremely small value of about 12 microamperes. Therefore, the power dissipation at each elementary memory circuit is not greater than 240 microwatts. On the other hand, the switching time which is proportional to the product of the resistor $R_3$ or $R_4$ and the capacitance C observed between the junction 7 and terminals 1 and 2 is shorter than 100 nanoseconds. The speed of the read-out operation depends mainly on the product of the resistance and the capacitance of the current path from the terminals 4 or 5 to the read-out means. The last-mentioned capacitance is approximately proportional to the number of the memory elements. For example, in the case where 300 memory elements are connected in parallel, the read-out speed is approximately 30 nanoseconds. Thus, the cycle time of the memory element can easily be shortened to a value of about 200 nanoseconds.

Although the foregoing explanation deals only with one elementary storage circuit, it should be noted that it is also applicable to information storage devices for computer use which contain a number of identical elementary circuits.

It should also be noted that a number of the elementary storage circuits shown in FIG. 3 are easily incorporated into an integrated semiconductive structure. The method for producing such an integrated structure will be explained hereinafter.

Examples of the construction of each circuit element used in the structure of the present invention are shown in FIG. 4. FIG. 4(*a*) shows a p-type channel MOST having drain, gate and source electrodes; FIG. 4(*b*) shows a diode; FIG. 4(*c*) a cross-over of the conductive layers 8 and 9 of aluminum evaporated film, and FIG. 4(*d*) an Al-$SiO_2$ resistor. Since the constructions shown in FIGS. 4(*a*), (*b*) and (*c*) are well-known in the art, their explanation will be omitted.

The Al-$SiO_2$ resistor shown in FIG. 4(*d*) is produced by forming a silicon oxide film 11 on an n-type silicon substrate 12; evaporating aluminum over the film 11; photo-etching away the undesired portion of the evaporated aluminum layer; subjecting the photo-etched plate to a temperature of from 600–800° C. in inert gas atmosphere for a period sufficient to cause the desired thermal reaction process between the aluminum layer and the film 11 to form a reaction layer 13; and attaching a pair of the electrodes 14 to the layer 13. Since the sheet resistivity of the layer 13 of aluminum and silicon oxide ranges from 10 kilohms to 100 kilohms per square, it is easy to obtain a resistance element of the order of 1 megohm resistance.

FIG. 5 shows a method for realizing the circuit of FIG. 3 in the form of a semiconductor integrated circuit by incorporating all the elements of FIG. 4 into a single semiconductive structure. In order to facilitate an understanding of the invention, details of incidental steps in the process, such as washing the substrate, will be omitted and only the principal steps will be described.

First, the p-type regions 25 and 26 are formed on the surface of the substrate 21 as is shown in FIG. 5(*a*), by oxidizing an n-type silicon wafer 21 to form a silicon oxide $SiO_2$ film 22–1 thereon; the portions 23 and 24 of the oxidation film corresponding to the diode and the cross-over portions are then removed by photo-etching and a p-type impurity is diffused in the substrate to form the p-type region. Next, the p-type impurity diffused layers 25 and 26 are further developed by thermal oxidation and an oxidation film 22–2 is formed over the entire surface. In the next step, the portions 27, 28 and 29 which correspond respectively to the p+-regions (+ indicates relatively heavy doping and high conductivity) of the MOST, the diode and the cross-over, are subjected to photo-etching to remove the oxidation film thereon and to further the diffusion of p-type impurity. Thus, p+-regions 31, 32 and 33 are formed (FIG. 5(*b*)).

Subsequently, by way of oxidation, the p+-type impurity diffused layers 31, 32 and 33 are further developed and an oxidation film 22–3 is formed over the entire surface. The oxidation film of the portion 34 corresponding to the n+-region of the diode is removed by photo-etching and then an n-type impurity is diffused in the portion 34. Thus, n+-region 35 is formed (FIG. 5(*c*)).

In the next step, the n-type impurity diffused layer 35 is further developed by oxidation and the oxidation film 22–4 is formed. The oxidation film on the portion 36 corresponding to gate electrode of the MOST is then removed by photo-etching (FIG. 5(*d*)). Subsequently, an oxidation film 22–5 of a thickness approximately 1000 angstroms is formed for the gate of MOST as shown in FIG. 5(*e*). A portion 43 corresponding to an Al-$SiO_2$ resistor is then formed by aluminum evaporation and subsequent photo-etching. The substrate 21 is then subjected to heating in an atmosphere of inert gas to form a thermal reaction layer 37 of aluminum and silicon oxide film as shown in FIG. 5(*f*).

The portions of the oxidation film respectively corresponding to the electrodes of the MOST, the diode and the cross-over are removed by photo-etching. Aluminum is then evaporated over the entire surface to form an aluminum layer, which is removed by photo-etching technique with the exception of the portions 41 corresponding to the electrodes of the MOST, the diode, the cross-over, and Al-$SiO_2$ resistor and the portions 42 corresponding to the connection to be provided between each of the elements partly shown in FIG. 5(*g*).

Although not illustrated in the drawing, each of the circuit elements of the circuit shown in FIG. 3 is formed in a single semiconductor substrate by the above-described method in such manner that the circuit elements are suitably arranged. Conductive layers of aluminum or other metal in a strip form are then provided on the substrate to connect the circuit elements and form the described circuit or circuits, as disclosed, for example, in United States Patent No. 3,199,002. Steps following the above-mentioned processes are similar to those employed in the manufacture of conventional semiconductor integrated circuits. This, it will be understood that an information storage device composed of a number of the elementary storage circuits shown in FIGS. 4 and 5 may be incorporated in a single substrate 21.

Although in the above-mentioned embodiment an n-type silicon wafer is used as the semiconductor substrate and a thermal oxidation method is employed for the oxidation process, other semiconductor wafers, such as germanium, may be used as the substrate and, the oxide layer may be formed by growth from the vapor phase or by any other method. Further, although an n-type silicon substrate, a MOST with a p-type channel and an n+-p diode are used in the described embodiment, a similar semiconductor integrated circuit for information storage use may be manufactured by making use of a p-type silicon or germanium substrate, on which a MOST of the enhancement type with an n-type channel and a p+-n diode are formed. The resistors $R_3$ and $R_4$ may be replaced by any other resistance element, for example, of the well-known diffusion type utilizing a bulk resistance of the diffused layer in a semiconductor substrate.

These and additional modifications will be apparent to those versed in the art and the foregoing description is by way of example only and is not intended as a limitation on the invention set forth in the following claims.

What is claimed is:

1. In an information storage circuit of the type comprising a flip-flop circuit having first and second field effect transistors, the improvement comprising:

serial high and low resistance resistors coupled to each of said transistors, and a pair of diodes respectively connected to the junction of each high and low resistance resistors; said low resistance resistors each being coupled adjacent said transistors for forming a current path through said diode and said low resistance during predetermined operations of said circuit.

2. The improvement claimed in claim 1 further comprising means for applying a constant voltage to each resistor series at the end thereof opposite the end connected to said transistors, and means for applying a driving voltage to the end of each of said diodes opposite the end connected to said resistor junctions.

3. The improvement claimed in claim 2 further comprising means for coupling one of the output electrodes of each of said transistors in common to a reference potential, means for connecting the other of the output electrodes of each of said transistors to the control electrode of the other transistor, and a third and fourth field effect transistor, the control electrodes of said third and fourth transistors being connected respectively to each of said diodes and the output electrodes thereof being connected between the control electrodes of the respective first and second field effect transistors and respective terminals for receiving a second control signal and deriving information stored in said information storage circuit.

References Cited

IBM Technical Disclosure Bulletin, vol. 8, No. 12, May 1966, pp. 1838–9. "Field-Effect Memory Cell With Low Standby Power and High Switching Speed" by Pleshko.

TERRELL W. FEARS, Primary Examiner

U.S. Cl. X.R.

307—205, 238